(12) United States Patent
Kim et al.

(10) Patent No.: US 8,296,270 B2
(45) Date of Patent: Oct. 23, 2012

(54) ADAPTIVE LOGGING APPARATUS AND METHOD

(75) Inventors: Young-seok Kim, Yongin-si (KR); Hee-gyu Jin, Suwon-si (KR); Kyoung-gu Woo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 204 days.

(21) Appl. No.: 12/793,158

(22) Filed: Jun. 3, 2010

(65) Prior Publication Data

US 2011/0099149 A1   Apr. 28, 2011

(30) Foreign Application Priority Data

Oct. 28, 2009   (KR) .................. 10-2009-0102972

(51) Int. Cl.
*G06F 17/30* (2006.01)
(52) U.S. Cl. ........................................... 707/672
(58) Field of Classification Search .............. 707/672, 707/694, 812, 822, 818, 819
See application file for complete search history.

(56) References Cited

U.S. PATENT DOCUMENTS

| | | | | |
|---|---|---|---|---|
| 4,945,474 A * | 7/1990 | Elliott et al. | ................... | 714/16 |
| 5,043,866 A * | 8/1991 | Myre et al. | .................. | 1/1 |
| 6,226,651 B1 * | 5/2001 | Masuda et al. | .................. | 1/1 |
| 6,678,809 B1 * | 1/2004 | Delaney et al. | ............... | 711/162 |
| 7,870,416 B2 * | 1/2011 | D'Souza et al. | .................. | 1/1 |
| 7,917,475 B2 * | 3/2011 | D'Souza et al. | .............. | 707/656 |
| 2002/0147736 A1 * | 10/2002 | Isip, Jr. | .................. | 707/200 |
| 2003/0078910 A1 * | 4/2003 | Kanai et al. | .................. | 707/1 |
| 2004/0243535 A1 | 12/2004 | Bailey | | |
| 2004/0267835 A1 | 12/2004 | Zwilling et al. | | |
| 2005/0289189 A1 | 12/2005 | Nettleton et al. | | |
| 2006/0173922 A1 * | 8/2006 | Banzon et al. | ................. | 707/200 |
| 2006/0190503 A1 * | 8/2006 | Naicken et al. | ................ | 707/204 |
| 2007/0005664 A1 * | 1/2007 | Kodavalla et al. | ............ | 707/202 |
| 2007/0174355 A1 | 7/2007 | Woo et al. | | |
| 2008/0189339 A1 | 8/2008 | Mignet et al. | | |
| 2008/0228834 A1 * | 9/2008 | Burchall et al. | ............... | 707/202 |
| 2009/0055578 A1 * | 2/2009 | Lee et al. | ...................... | 711/103 |
| 2009/0164524 A1 | 6/2009 | Whang et al. | | |
| 2010/0188412 A1 * | 7/2010 | Li et al. | ......................... | 345/557 |
| 2010/0191922 A1 * | 7/2010 | Dickey et al. | .................. | 711/154 |
| 2010/0287346 A1 * | 11/2010 | Schreter | ........................ | 711/162 |

FOREIGN PATENT DOCUMENTS

| | | |
|---|---|---|
| KR | 10-2001-0055981 | 7/2001 |
| KR | 10-2002-0030223 | 4/2002 |
| KR | 10-2004-0103470 | 12/2004 |
| KR | 10-2006-0046029 | 5/2006 |
| KR | 10-2006-0122677 | 11/2006 |
| KR | 10-2007-0074836 | 7/2007 |
| KR | 10-2008-0001230 | 1/2008 |

OTHER PUBLICATIONS

Mohan et al, "ARIES:A Transaction Recovery Method Supporting Fine-Granularity Locking and PArtial Rollbacks Using Write-Ahead Logging", ACM Transactions on Database Systems, vol. 17, No. 1, Mar. 1992, pp. 94-162.*

* cited by examiner

*Primary Examiner* — Cam-Linh Nguyen
(74) *Attorney, Agent, or Firm* — NSIP Law (57) ABSTRACT

An adaptive logging apparatus and method are provided. Using the adaptive logging apparatus and method, it is possible to accumulatively store the size of log records generated according to a data update request, and selectively perform algorithms for Recovery and Isolation Exploiting Semantics (ARIES) logging and shadow paging logging, according to the size of the stored log records.

20 Claims, 10 Drawing Sheets

| prevLSN (301) | txnID (302) | Type (303) | pageID (304) | Length (305) | Offset (306) | before_img (307) | after_img (308) |

FIG.7

ADAPTIVE LOGGING APPARATUS AND METHOD

CROSS REFERENCE TO RELATED APPLICATION(S)

This application claims the benefit under 35 U.S.C. §119 (a) of Korean Patent Application No. 10-2009-0102972, filed on Oct. 28, 2009, in the Korean Intellectual Property Office, the entire disclosure of which is incorporated herein by reference for all purposes.

BACKGROUND

1. Field

The following description relates to an adaptive logging apparatus and method, and more particularly, to logging technology for updating data in a database system.

2. Description of the Related Art

When an operation such as an insert, delete, update, or other operation occurs in a database, various update patterns may need to be performed according to the how data is stored in the database.

For example, the various update patterns may include a first update pattern in which a small amount of data is updated for a page, a second update pattern in which a large amount of data is updated for a page, a third update pattern in which a small amount of data is updated for a page, and a large amount of data is updated for another page, and the like.

Because it is difficult to know or predict the situation of data stored in the database in advance, it is very difficult to predict which update pattern each transaction will exhibit.

For example, a "Music" table may consist of the following fields: Title, Artist, Album, Genre, Play Count, Favorite, and File Path. In addition, 10,000 records may be stored in the "Music" table, and the table may be stored in a database. When a user deletes records having a Play Count of "0", for example, it is difficult to know how many of the 10,000 records have a Play Count of "0," because the amount changes dynamically over time as new files are added, and songs are played for the first time. Accordingly, although the same query is performed (i.e. files having the Play Count of "0"), the size of deleted records varies according to the situation of data stored in the table, because files are constantly being updated.

Consequently, a data page containing the data of a record to be deleted may have various update patterns, and the most efficient logging methods for the respective update patterns may differ from each other, making it difficult to predict how data is going to be updated in the database.

SUMMARY

In one general aspect, there is provided an adaptive logging apparatus, comprising an amount-of-update storage configured to store an amount of updated data based on a transaction type or data page type in response to a data update request, and a data updater configured to compare the amount of updated data to a threshold value, if the amount of updated data is less than the threshold value, update the data page according to an Algorithms for Recovery and Isolation Exploiting Semantics (ARIES) policy, and if the amount of updated data is greater than or equal to the threshold value, update the data page according to a shadow paging policy.

The amount of updated data may comprise an accumulated amount of log records that are generated in response to the update request.

If the data page is updated according to the ARIES policy, the data updater may further be configured to generate a log record about the data that is updated in response to the update request.

If the data page is updated according to the shadow paging policy, the data updater may further be configured to generate a shadow copy of the data page and update the data page in the generated shadow copy without a log record.

If the shadow copy is generated, the data updater may further be configured to update a page table in which logical page identifiers (IDs) and physical page IDs are mapped to each other.

If the transaction is performed, the data updater may further be configured to invalidate an original of the shadow copy.

The data page updated according to the shadow paging policy may be configured to be flushed to a stable storage before the transaction is performed.

In another aspect, there is provided an adaptive logging method, comprising storing an amount of updated data based on a transaction type or data page type, in response to a data update request, comparing the amount of updated data with a threshold value, if the amount of updated data is less than the threshold value, updating the data page according to an Algorithms for Recovery and Isolation Exploiting Semantics (ARIES) policy, and if the amount of updated data is greater than or equal to the threshold value, updating the data page according to a shadow paging policy.

The amount of updated data may comprise an accumulated amount of log records that are generated in response to the update request.

The updating of the data page according to the ARIES policy may comprise generating a log record about the data that is updated in response the update request.

The updating of the data page according to the shadow paging policy may comprise generating a shadow copy of the data page and updating the data page in the generated shadow copy without using a log record.

The updating of the data page according to the shadow paging policy may further comprise updating a page table in which logical page identifiers (IDs) and physical page IDs are mapped to each other.

The updating of the data page according to the shadow paging policy may further comprise invalidating an original of the shadow copy when the transaction is performed.

The data page updated according to the shadow paging policy may be flushed to a stable storage before the transaction is performed.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Figure 1:
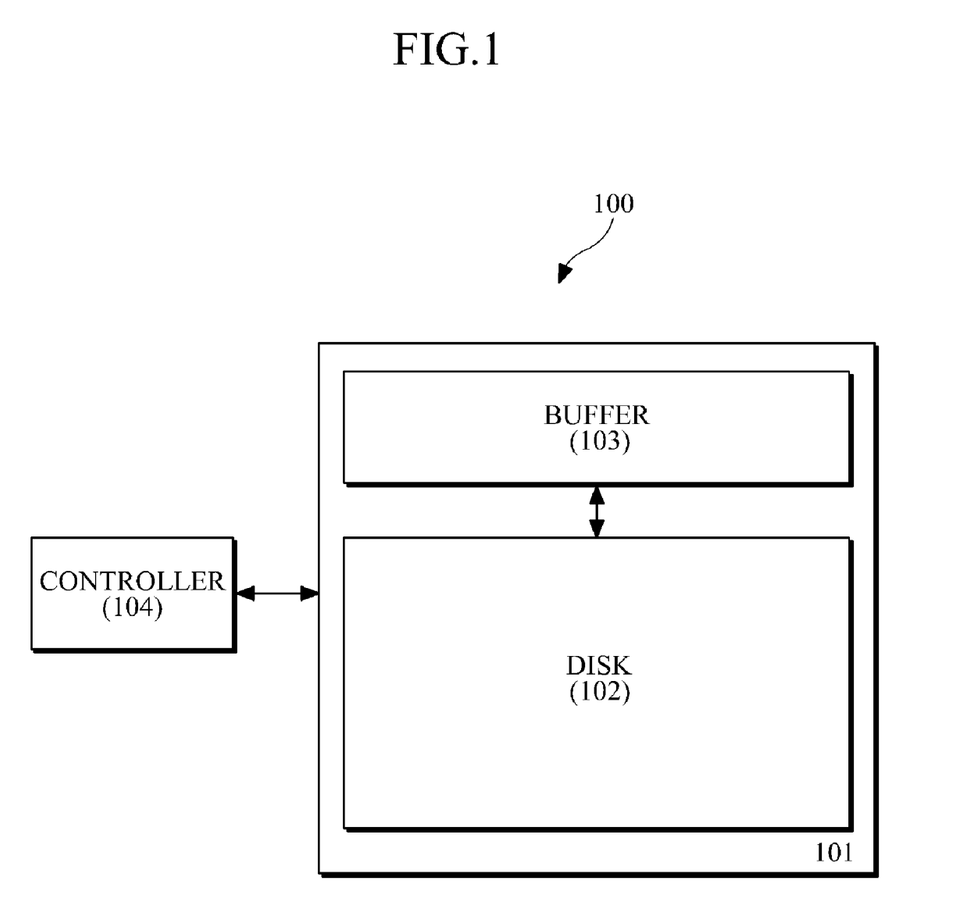
FIG. 1 is a diagram illustrating an example of a database system.

FIG. 1 illustrates an example of a database system. Referring to FIG. 1, database system 100 includes a storage 101 and a controller 104. The database system 100 may be included in a terminal, such as a personal computer, a mobile terminal, a personal-digital assistant, and the like.

The storage 101 stores pieces of logically related data, and in this example the storage 101 includes a disk 102 and a buffer 103. The disk 102 may be a storage, for example, a non-volatile memory such as a hard disk, a solid-state drive (SSD), a flash memory, and the like, that stably stores data regardless of power supply. The buffer 103 may function to temporarily store data that will be recorded or that has been read when the data is recorded in the disk 102 or read from the disk 102.

The controller 104 may function to receive a data update request according to a type of transaction and update data stored in the storage 101 based on the received data update request. If the system does not operate during a transaction, the controller 104 may perform a recovery operation to recover the system.

For example, the controller 104 may find an update pattern that varies during a transaction and dynamically perform logging and recovery operations appropriate to the pattern.

Figure 2:
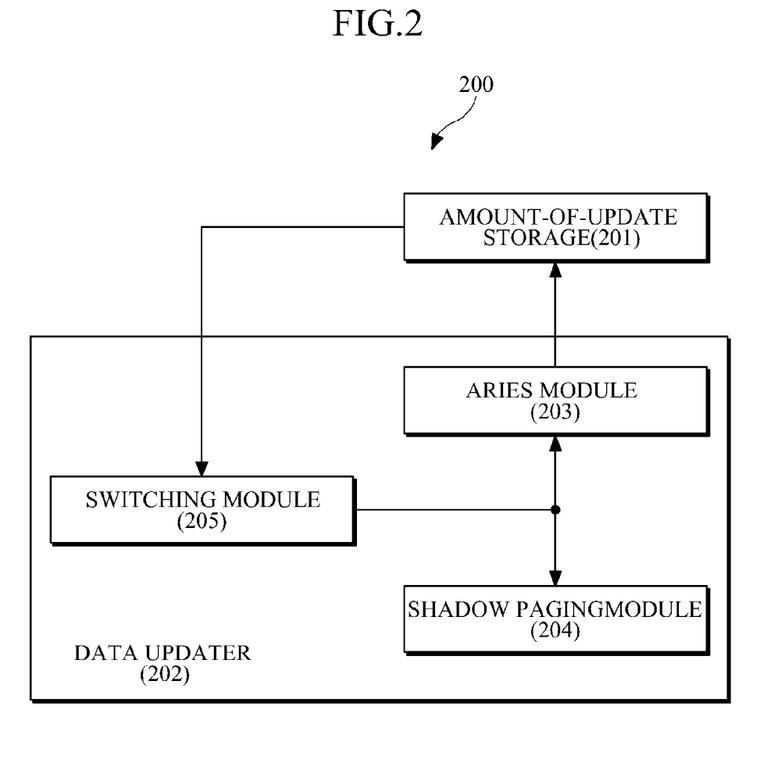
FIG. 2 is a diagram illustrating an example of an adaptive logging apparatus.

FIG. 2 illustrates an example of an adaptive logging apparatus. The adaptive logging apparatus may be used as the controller 104 illustrated in FIG. 1. Referring to FIG. 2, adaptive logging apparatus 200 includes an amount-of-update storage 201 and a data updater 202.

The amount-of-update storage 201 may store the amount of updated data based on a type of transaction or type of data page, in response to a data update request. For example, the amount of updated data may be an accumulated amount of log records related to the data that is updated in response to the data update request.

In response to updating data in the first data page, first data is generated to refer to the amount of updated data. In similar manner, in response to updating data in the second data page that is different from the first data page, second data is generated to refer to the amount of updated data. That is, the data related to the amount of updated data can be individually generated according to the data pages or types of the data pages where the data update has occurred.

The data updater 202 may compare the amount of updated data stored in the amount-of-update storage 201 to a threshold value. For example, if the amount of updated data is less than the threshold value, a data page may be updated based on an Algorithms for Recovery and Isolation Exploiting Semantics (ARIES) policy. In another example, if the amount of update data is equal to or greater than the threshold value, a data page may be updated based on a shadow paging policy.

For example, the data updater 202 may include an ARIES module 203 that updates a data page based on the ARIES policy, a shadow paging module 204 that updates a data page based on the shadow paging policy, a switching module 205 that selectively operates the ARIES module 203 and the shadow paging module 204 based on the amount of update data, and the like.

ARIES refers to a logging method that supports a logging protocol called write ahead logging (WAL) and steal and no-force buffer management policies. In the ARIES example, to reflect an updated data page on the disk 102, an associated log record may be recorded on the disk 102 in advance. Thus, it may be possible to ensure the atomicity, consistency, isolation, and durability (ACID) of a data page that is updated by a transaction, regardless of a finish state, because a record log is maintained and stored.

Shadow paging refers to a logging method that generates a shadow copy of a data page that is to be updated without generating a log record, and then updating data on the shadow copy. In shadow paging, a log record is not generated, and thus a shadow copy is recorded in the disk 102 before a transaction is performed.

In other words, the data updater 202 may update a data page while generating a log record according to the ARIES policy when a transaction starts. When the amount of log records generated during the transaction becomes greater than a threshold value, the data updater 202 may be allocated a predetermined page from the buffer 103 to generate a shadow copy instead of generating a log record. Accordingly, the data updater 202 may update data in the generated shadow copy, without having to maintain and store a log record, thus reducing the overall amount of data that needs to be stored.

Accordingly, the logging apparatus 200 may find the amount of updated data according to a transaction type or data page type and dynamically or adaptively provide an appropriate logging method, thereby optimizing time and/or cost for a logging operation.

For ease of description the example logging apparatus 200 shown in FIG. 2 includes the ARIES module 203, the shadow paging module 204, and the switching module 205, each located within the data updater 202. However, it should be understood that any of the ARIES module 203, the shadow paging module 204, and the switching module 205, may be located separately and may exist in a separate unit. For example, each of the ARIES module 203, the shadow paging module 204, and the switching module 205 may be located in a separate unit. In some embodiments, two of the modules may be located in the same unit, for example, the ARIES module 203 and the shadow paging module 204 may be located in the same unit, while the switching module 205 may be located in a separate unit.

Figure 3:
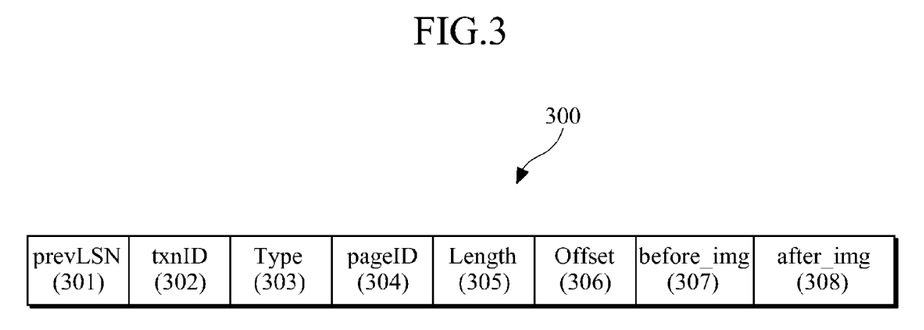
FIG. 3 is a diagram illustrating an example format of a log record.

FIG. 3 illustrates an example format of a log record. Referring to FIG. 3, examples of various data fields of a log record 300 are described below.

The field "prevLSN 301" refers to the last sequence number (LSN) of a previous log record generated by a transaction. The field "txnID 302" refers to the identifier (ID) of the transaction. The field "Type 303" refers to the type of the log record. For example, the type of a log record may be an undo log record or redo log record. The field "pageID 304" refers to the ID of an updated data page. The field "Length 305" refers to the size of updated data. The field "Offset 306" refers to an offset in the updated data page. The field "before_img 307" refers to data before update. The field "after_img 308" refers to data after update.

Figure 4:
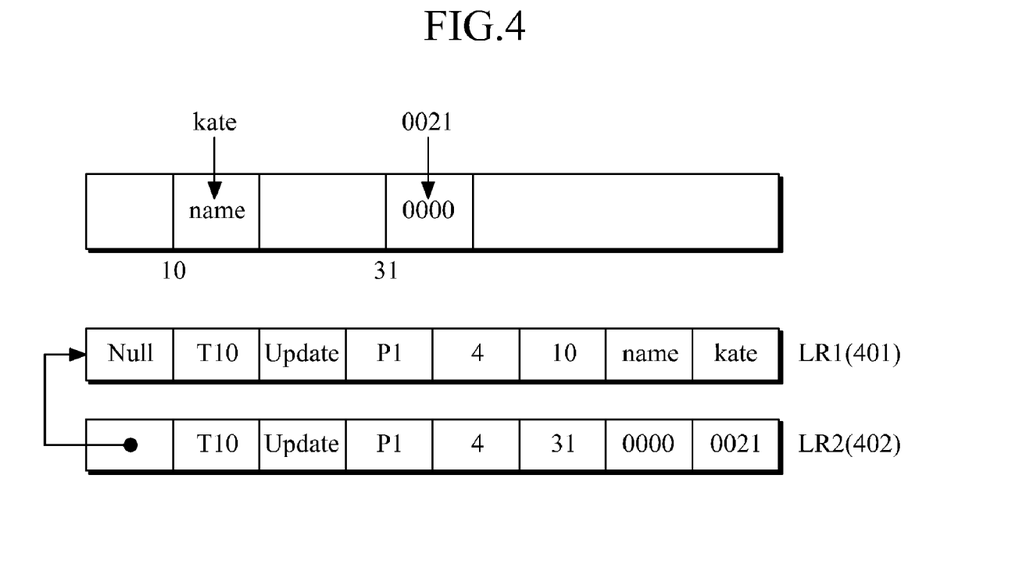
FIG. 4 is a diagram illustrating an example of a generated log record.

FIG. 4 illustrates an example of a generated log record.

Referring to FIG. 4, when data in an offset field 10 of a data page is changed from "name" to "Kate," an LR1 log record 401 may be generated. Also, when data in an offset field 31 of the data page is changed from "0000" to "0021," an LR2 log record 402 may be generated.

The amount of update data may be the accumulated size of generated log records. For example, in FIG. 4, when "name" is changed to "Kate" and "0000" is changed to "0021" according to a transaction type, the sum of the size of the LR1 log record 401 and the size of the LR2 log record 402 may be the amount of update data. The amount of update may be accumulatively stored according to a transaction type or a data page type.

FIGS. 5A through 5F illustrate example processes of an adaptive logging apparatus.

Figure 5A:
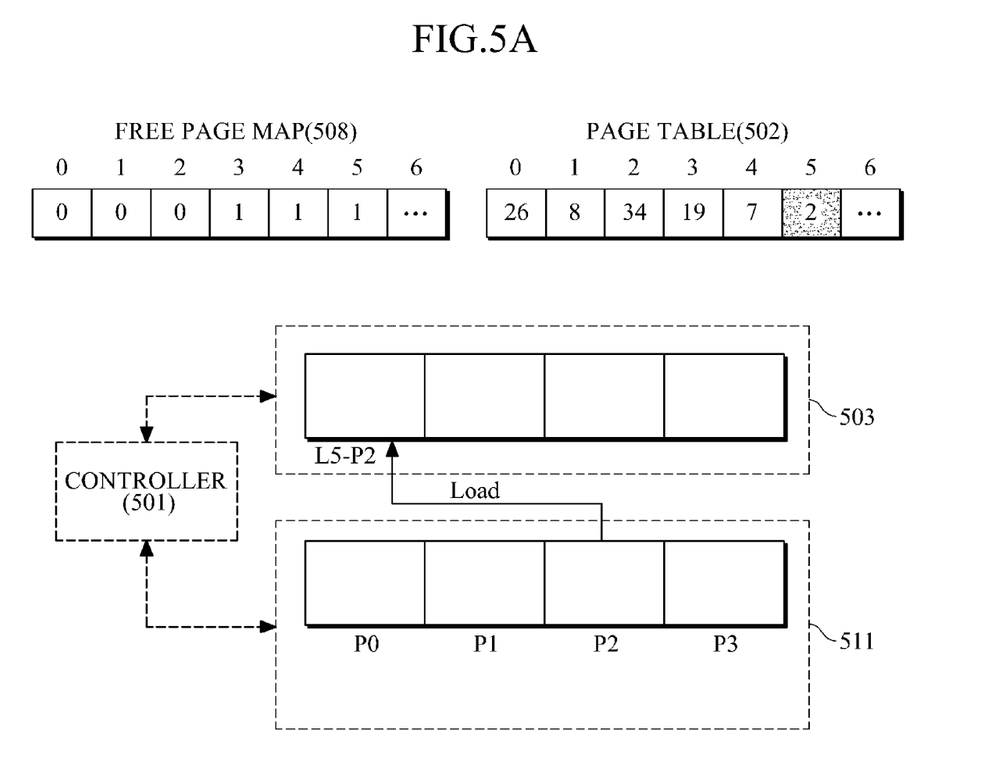
FIGS. 5A through 5F are diagrams illustrating example processes of an adaptive logging apparatus.

Referring to FIG. 5A, when an update of LPageID_5 (i.e., a data page having a logical page ID "5") is requested as a transaction type, a controller 501 may load PPageID_2 (i.e., a data page having a physical page ID of "2") corresponding to LPageID_5 into a buffer 503, with reference to a page table 502. The page table 502 is an arrangement table in which physical page IDs (PPageIDs) that correspond to logical page IDs (LPageIDs) are recorded. For example, when an index "5" of the page table 502 corresponds to a value of 2, LPageID_5 corresponds to PPageID_2.

Figure 5B:
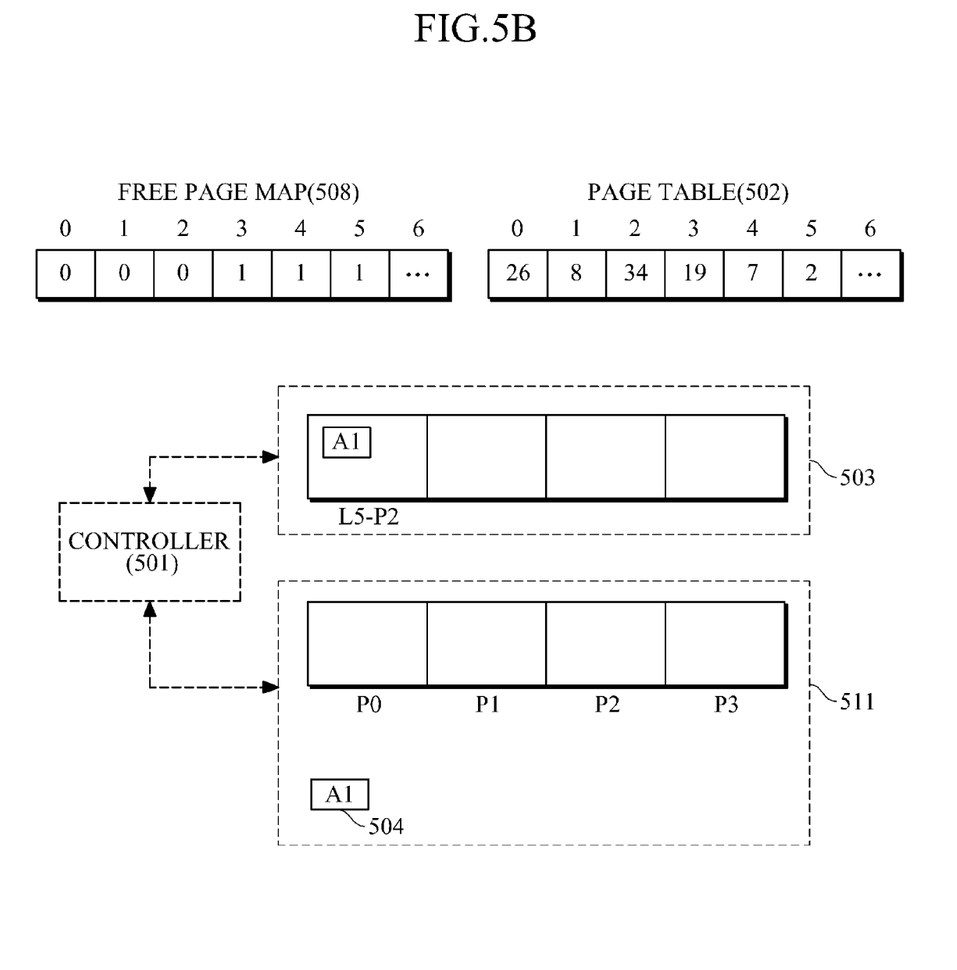

Referring to FIG. 5B, when the data page is loaded into the buffer 503, the controller 501 may generate a log record 504 related to the update, and may update the data page in the buffer 503. In this example, rectangle A1 refers to updated data or image in the data page. For example, the controller 501 may generate and store the A1 log record 504 and update A1. Accordingly, the A1 log record 504 may have a format that is the same as the format of the log record 300 shown in FIG. 3.

The controller 501 may store the size of the generated A1 log record 504 based on a transaction type or data page type. For example, the amount-of-update storage 201 of FIG. 2 may store the size of the A1 log record 504 about PPageID_2.

Also, the controller 501 may compare the size of the generated A1 log record 504 to a threshold value. For example, the data updater 202 of FIG. 2 may compare the size of the generated A1 log record 504 to the threshold value.

When the size of the generated A1 log record 504 is smaller than the threshold value, the data may be updated according to the ARIES policy.

Figure 5C:
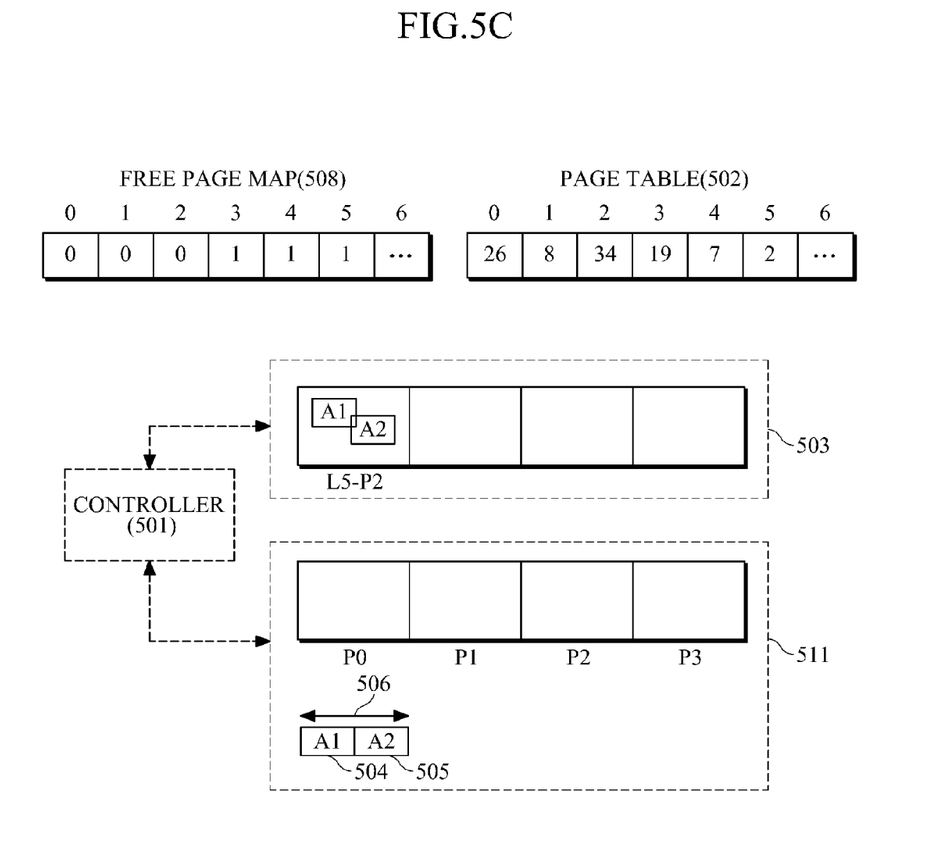

Referring to FIG. 5C, when an update of A2 is requested, the controller 501 may generate and store an A2 log record 505, and update A2 in the buffer 503. The controller 501 may accumulatively store the size of the generated log record. Accordingly, the sum of the size of the A1 log record 504 and the size of the A2 log record 505 may be stored. Also, the controller 501 may compare a size 506 of the accumulatively stored log records to the threshold value. For example, if the size of the generated log records is smaller than the threshold value, the process described with reference to FIGS. 5B and 5C may be repeated. Conversely, if the size of the generated log records is equal to or larger than the threshold value, the data may be updated according to the shadow paging policy that is illustrated in FIG. 5D.

Figure 5D:
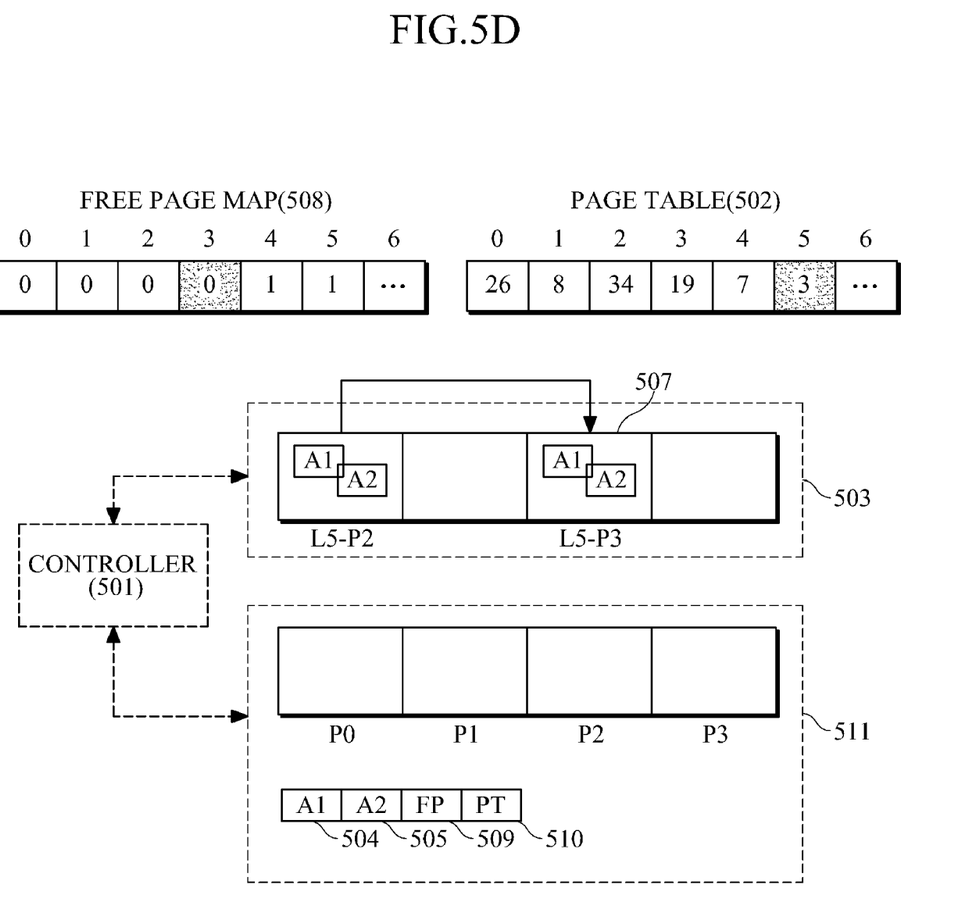

Referring to the examples shown in FIG. 5D, when the size of the generated log records is equal to or larger than the threshold value, the controller 501 may generate a shadow copy 507. For example, the shadow copy 507 may correspond to an area of the buffer 503 that is newly allocated for shadow paging.

To generate the shadow copy 507, the controller 501 may update a free page map 508 before generating the shadow copy 507. In this example, the free page map 508 may be a table indicating available pages. For example, when a value of 1 corresponding to an index "3" is updated with 0, this may indicate that PPageID_3 is not an available page. The update information of the free page map 508 may be stored as a free page (FP) log record 509.

When the free page map 508 is updated, the controller 501 may generate the shadow copy 507 and update the page table 502. For example, PPageID_3 may be allocated as the shadow copy 507, and a value corresponding to an index "5" of the page table 502 may be changed to 3. The update information of the page table 502 may be stored as a PT log record 510.

Figure 5E:
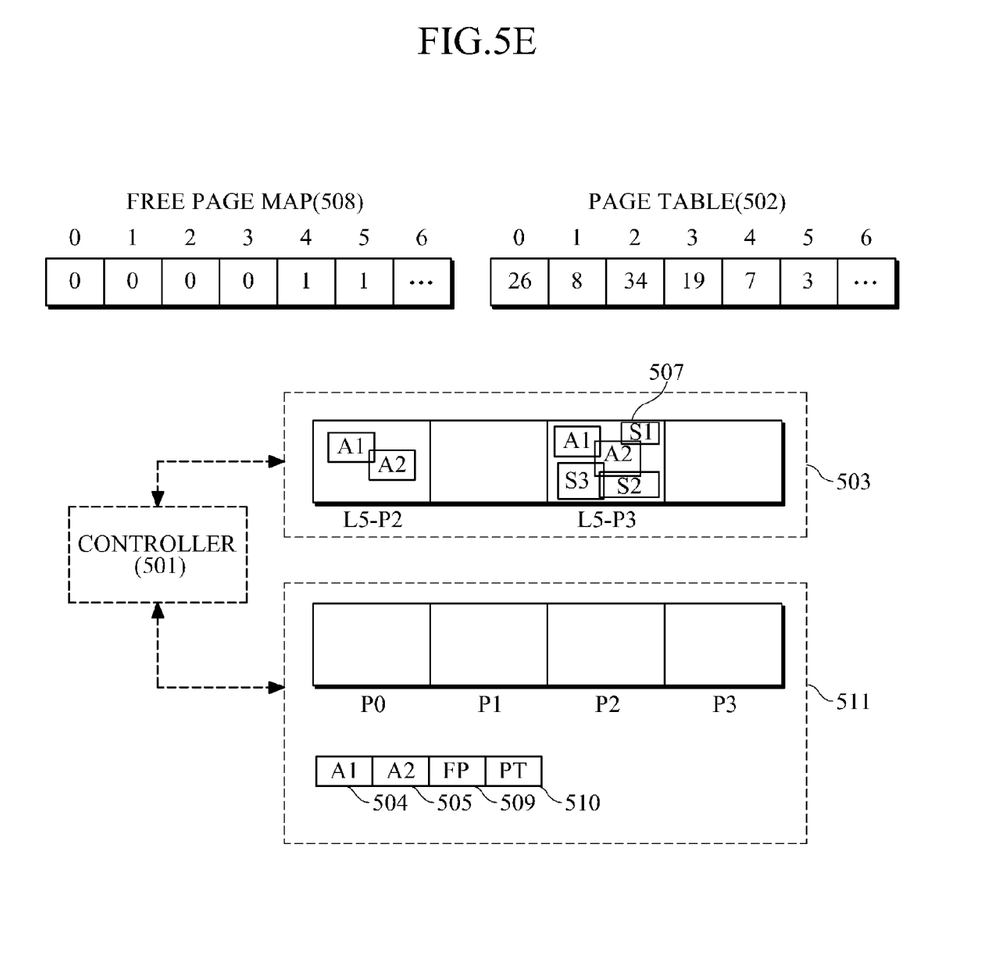

After the shadow copy 507 is generated, an update of a data page may be performed in the shadow copy 507, as illustrated in FIG. 5E. In this example, rectangles S1 to S3 in FIG. 5E refer to data or images updated according to the shadow paging policy.

Figure 5F:
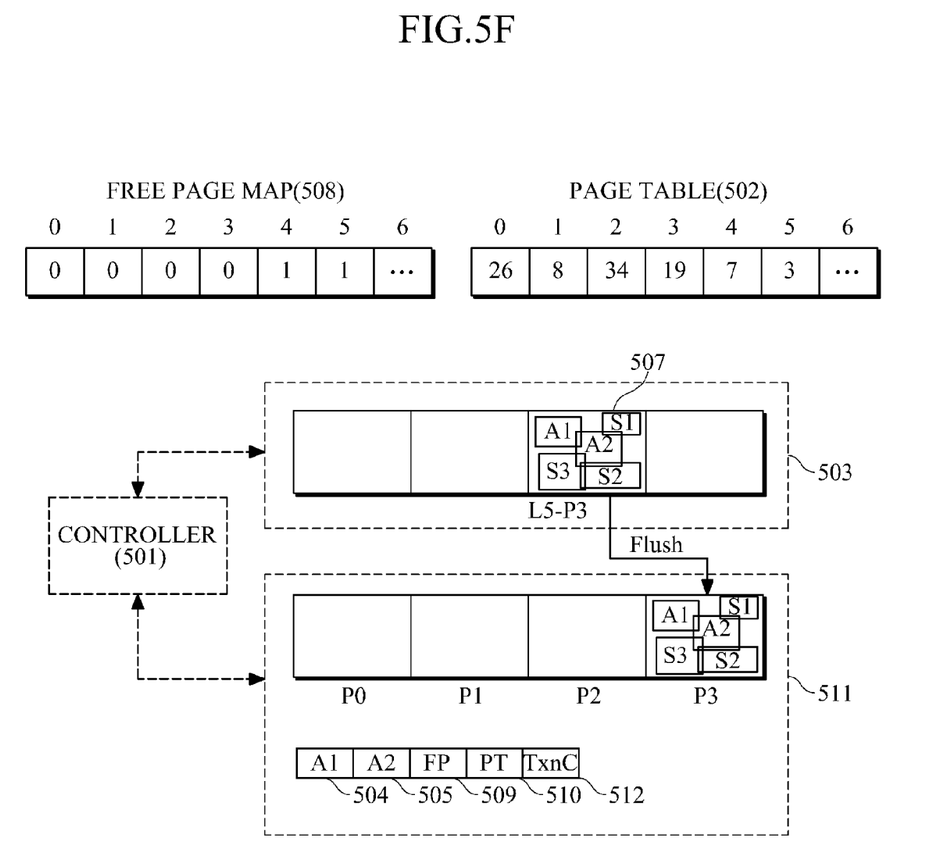

Referring to FIG. 5F, the controller 501 may flush the shadow copy 507 to a disk 511 before a transaction is performed, and may generate and stores a TxnC log record 512 related to the transaction performed and invalidate the original shadow copy 507 when the transaction is completed.

Referring to FIGS. 5A to 5F, when the data of LPageID_5 is updated, ARIES logging may be performed at the beginning, and shadow paging logging may subsequently be performed based on the amount of updates and/or updated data.

Figure 6:
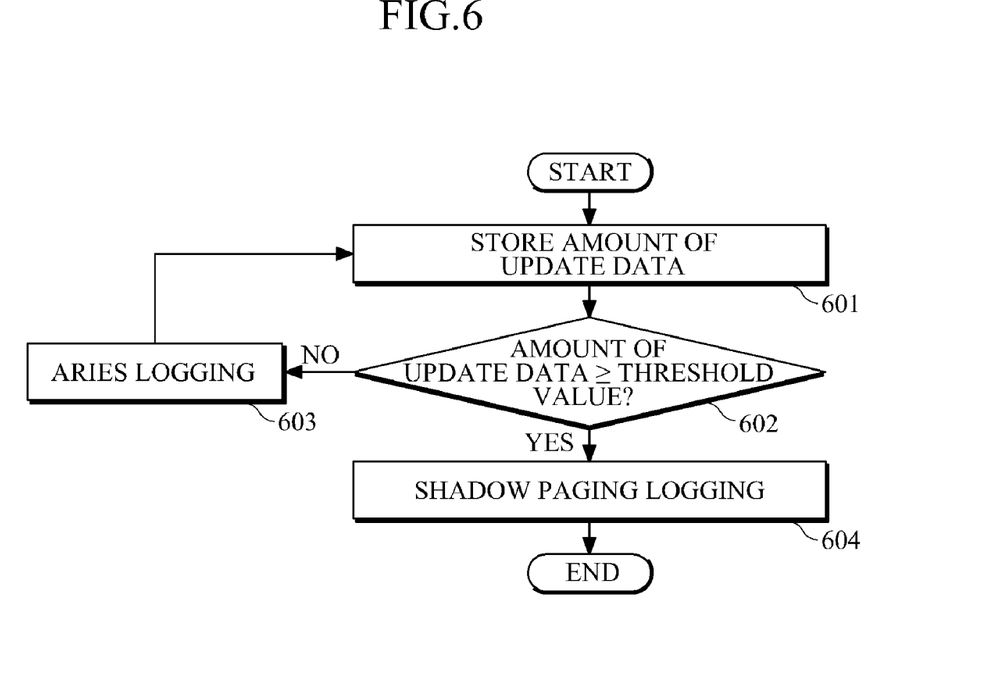
FIG. 6 is a flowchart illustrating an example of an adaptive logging method.

FIG. 6 illustrates an example of an adaptive logging method.

Referring to FIG. 2 and FIG. 6, when there is a data page update request based on a transaction type or data page type, in operation 601 the amount-of-update storage 201 stores the amount of updated data based on a transaction type or page type. For example, the amount of updated data may be generated according to a data page update, and may be the size of accumulatively stored log records.

In operation 602, the data updater 202 compares the stored amount of update data with a threshold value.

For example, if the amount of update data is less than the threshold value, in operation 603 the data updater 202 updates a data page according to the ARIES policy. For example, the data updater 202 may generate a log record and update data in a buffer, as described above with reference to FIGS. 5B and 5C.

For example, if the amount of update data is equal to or greater than the threshold value, in operation 604, the data updater 202 updates the data page according to the shadow paging policy. For example, the data updater 202 may update data in a shadow copy without generating a log record, as is described above with reference to FIGS. 5D and 5F.

Figure 7:
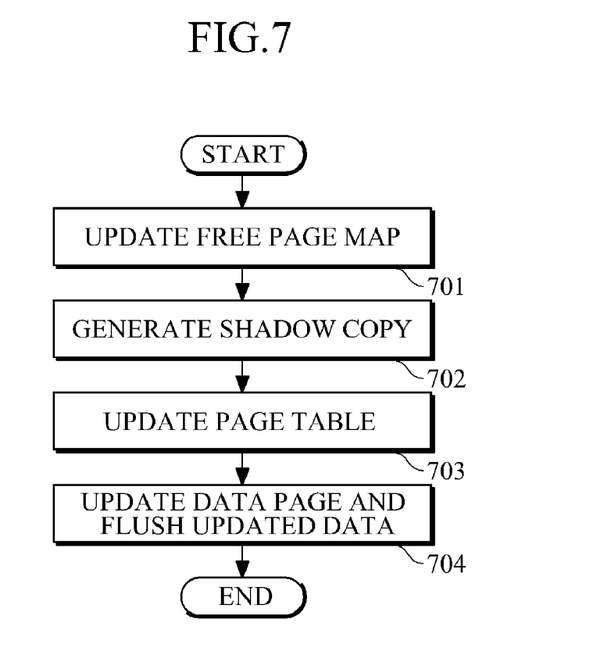
FIG. 7 is a flowchart illustrating an example of a shadow paging logging method.

FIG. 7 illustrates an example of a shadow paging logging method. The shadow paging logging method may be included in operation 604 described with reference to FIG. 6.

Referring to FIG. 2 and FIG. 7, when a data page is updated according to the shadow paging policy, in operation 701 the data updater 202 updates a free page map. The free page map may indicate pages that are currently available for allocation.

In operation 702, the data updater 202 generates a shadow copy. The shadow copy may be a part of a buffer that is newly allocated to update the data page according to the shadow paging policy.

When the shadow copy is generated, in operation 703 the data updater 202 updates a page table. The page table may include mapping information between LPageIDs and PPageIDs.

Subsequently, in operation 704 the data updater 202 updates data in the shadow copy and flushes the updated data of the shadow copy to a disk before a transaction is performed.

As apparent from the above description, the disclosed examples provide an apparatus and method that may adaptively or dynamically support a logging method based on an update situation.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable labtop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An adaptive logging apparatus, comprising:
    a processor configured to
        store an amount of updated data based on a transaction type or data page type in response to a data update request,
        compare the amount of updated data to a threshold value,
        if the amount of updated data is less than the threshold value, update the data page according to an Algorithms for Recovery and Isolation Exploiting Semantics (ARIES) policy, and
        if the amount of updated data is greater than or equal to the threshold value, update the data page according to a shadow paging policy.

2. The adaptive logging apparatus of claim 1, wherein the amount of updated data comprises an accumulated amount of log records that are generated in response to the update request.

3. The adaptive logging apparatus of claim 1, wherein, if the data page is updated according to the ARIES policy, the processor is further configured to generate a log record about the data that is updated in response to the update request.

4. The adaptive logging apparatus of claim 1, wherein, if the data page is updated according to the shadow paging policy, the processor is further configured to generate a shadow copy of the data page and update the data page in the generated shadow copy without a log record.

5. The adaptive logging apparatus of claim 4, wherein, if the shadow copy is generated, the processor is further configured to update a page table in which logical page identifiers (IDs) and physical page IDs are mapped to each other.

6. The adaptive logging apparatus of claim 4, wherein, if the transaction is performed, the processor is further configured to invalidate an original of the shadow copy.

7. The adaptive logging apparatus of claim 4, wherein the data page updated according to the shadow paging policy is configured to be flushed to a stable storage before the transaction is performed.

8. An adaptive logging method, comprising:
    storing an amount of updated data based on a transaction type or data page type, in response to a data update request;
    comparing, by a processor, the amount of updated data with a threshold value;
    if the amount of updated data is less than the threshold value, updating the data page according to an Algorithms for Recovery and Isolation Exploiting Semantics (ARIES) policy; and
    if the amount of updated data is greater than or equal to the threshold value, updating the data page according to a shadow paging policy.

9. The adaptive logging method of claim 8, wherein the amount of updated data comprises an accumulated amount of log records that are generated in response to the update request.

10. The adaptive logging method of claim 8, wherein the updating of the data page according to the ARIES policy comprises generating a log record about the data that is updated in response the update request.

11. The adaptive logging method of claim 8, wherein the updating of the data page according to the shadow paging policy comprises generating a shadow copy of the data page and updating the data page in the generated shadow copy without using a log record.

12. The adaptive logging method of claim 11, wherein the updating of the data page according to the shadow paging policy further comprises updating a page table in which logical page identifiers (IDs) and physical page IDs are mapped to each other.

13. The adaptive logging method of claim 11, wherein the updating of the data page according to the shadow paging policy further comprises invalidating an original of the shadow copy when the transaction is performed.

14. The adaptive logging method of claim 11, wherein the data page updated according to the shadow paging policy is flushed to a stable storage before the transaction is performed.

15. An adaptive logging apparatus, comprising:
a processor configured to
store an amount of updated data based on a transaction type or a data page type, in response to receiving a data update request,
compare the amount of data updated in response to the data update request, and configured to compare the amount of data updated to a threshold value, and
switch the processor between an Algorithms for Recovery and Isolation Exploiting Semantics (ARIES) updating policy and a shadow paging updating policy, based on the comparison with the threshold value.

16. The adaptive logging apparatus of claim 15, wherein, if the amount of updated data is less than the threshold value, the processor is further configured to update the data page according the ARIES updating policy.

17. The adaptive logging apparatus of claim 15, wherein, if the amount of updated data is greater than or equal to the threshold value, the processor is further configured to update the data page according the shadow paging updating policy.

18. The adaptive logging apparatus of claim 15, wherein the amount of updated data comprises an accumulated amount of log records that are generated in response to the update request.

19. The adaptive logging apparatus of claim 1, wherein the amount of updated data comprises an accumulated size of log records that are generated in response to the update request.

20. The adaptive logging apparatus of claim 19, wherein each of the log records comprises a last sequence number of a previous log record generated by a transaction, an identifier (ID) of the transaction, a type of a log record, an ID of the updated data page, a size of the updated data, an offset of the updated data in the updated data page, a first field of data before an update, and a second field of the updated data.

* * * * *